United States Patent Office 2,698,412
Patented Dec. 28, 1954

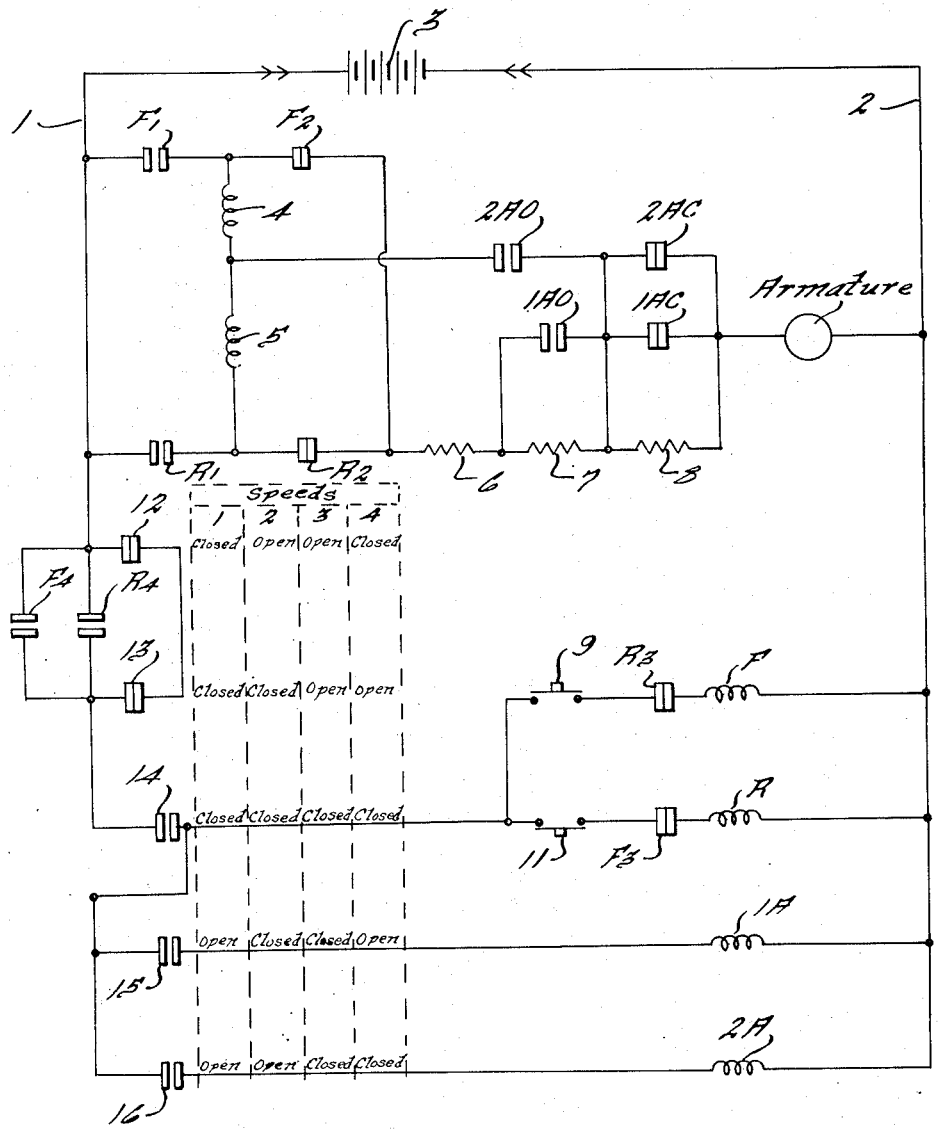

2,698,412

CONTROL CIRCUIT FOR SERIES MOTORS

Dorn L. Pettit, Milwaukee, Wis., assignor to Square D Company, Detroit, Mich., a corporation of Michigan Application July 26, 1952, Serial No. 301,149

6 Claims. (Cl. 318—252)

This invention relates to a control circuit for electric motors; more particularly this invention relates to a control circuit for an electric motor of the type having a field winding in series with the armature.

One object of the present invention is the provision of an improved control circuit for a series motor in which the electrical energy from the supply is used with high efficiency.

Another object of this invention is the provision of an improved control circuit for an electric motor which will provide both high torque and high speed conditions.

Another object of this invention is the provision of a control circuit in accordance with the preceding objects and in which the direction of the rotation of the motor may be reversed, the control circuit providing for substantially eliminating the effect of undesirable residual magnetic effects subsequent to the reversing operation.

Another object of the present invention is the provision of a control circuit in accordance with the preceding objects in which the motor may be smoothly accelerated through a plurality of speed positions.

Another object of the present invention is the provision of a control circuit for a series electric motor which will minimize the heating in the motor field during reversing operations.

Another object of the present invntion is the provision of a control circuit in accordance with the preceding objects which may be readily adapted for use with standard series motors.

Other objects and features of the invention will be readily apparent to those skilled in the art from the specification and appended drawing illustrating certain preferred embodiments in which the figure is a diagrammatic representation of a control circuit in accordance with the present invention in which contacts are represented as rectangular boxes, normally closed switches shown being represented by showing two of these rectangular boxes in contact with each other, while normally open switches are represented by two of these rectangular boxes spaced apart.

In the figure, there is disclosed a pair of conductors 1 and 2 connected to a source of electrical energy, illustrated as a battery 3. Disposed between the conductors 1 and 2 is an electric motor, having an armature and a field winding of two equal sections 4 and 5 in series with the armature, through a plurality of switches $F_1$, $F_2$, $R_1$, $R_2$, 1AO and 2AO and 1AC and 2AC. A plurality of resistors 6, 7 and 8 are connected as illustrated in the figure in circuit with the aforementioned switches and motor. While the field winding is shown in two separate sections (4 and 5), it is obvious that a single field winding having a center tap thereto could be employed.

Connected to the conductor 2 are a pair of electromagnetic coils F and R, controlling the directional circuit of the motor, as later described. In series with coil F is a normally closed switch $R_3$ and a normally open push button 9; serially connected with coil R is a normally closed switch $F_3$ and a normally open push button 11. As shown in the figure, there is also connected to conductor 2 a second pair of electromagnetic coils 1A and 2A which control the amount of resistance in circuit with the motor armature, in a manner to be described subsequently.

Controlling the passage of current through coils F, R, 1A and 2A are a plurality of switches 12, 13, 14, 15 and 16, and parallelling that part of the circuit including switches 12 and 13 is a switch $R_4$ and a switch $F_4$, as shown in the figure.

The switches $F_1$, $F_2$, $F_3$ and $F_4$ are operated simultaneously by the coil marked F, the switches $F_1$ and $F_4$ closing upon energization of the coil F, while switches $F_2$ and $F_3$ open upon energization of the coil F. Switches $R_1$, $R_2$, $R_3$ and $R_4$ are operated simultaneously by the coil R, energization of coil R effecting closure of switches $R_1$ and $R_4$ and opening of switches $R_2$ and $R_3$. Energization of electromagnetic coil 1A effects opening of the normally closed contact 1AC and simultaneous closure of the normally open contact 1AO. In exactly the same manner, switches 2AO and 2AC are operated by electromagnetic coil 2A.

Superimposed upon the figure is a dotted box containing a tabular record of the condition of each of the switches 12 through 16 in the four "speed" conditions of the electric motor, speed 1 being the low speed condition and speed 4 the highest speed condition. While it is obvious that other means may be employed to operate switches 12 through 16 in the sequence illustrated, one means for so operating the switches 12 through 16 is the device described and claimed in the copending application of Earl F. Mekelburg for Accelerating Master Swith, Serial No. 164,281 filed May 25, 1950. That application also discloses and claims means for operating these switches with a prdetermined time delay in each speed position, which those skilled in the art will readily recognize as desirable in any motor acceleration circuit.

The operation of the circuit of the present invention will now be described:

With the battery 3 connected to conductors 1 and 2, the operator may effect energization of the control circuit by first placing switches 12 through 16 in the condition described as speed 1. Then, by closure of either push button 9 or 11, the associated electromagnetic coil will be energized. Assuming the operator closes push button 9, current will initially pass through conductor 1, switches 12, 13 and 14, push button 9, and the electromagnetic coil F. Energization of coil F, as indicated earlier, effects closure of switches $F_1$, $F_4$ and opening of switches $F_2$ and $F_3$. (It will be seen that opening of switch $F_2$ prevents energization of electromagnetic coil R until coil F has been deenergized.) Current will then pass from the battery 3, through switch $F_1$, field windings 4 and 5, switch $R_2$, resistors 6 and 7, normally closed switch 1AC and through the armature to conductor 2.

After a predetermined period, switches 12 through 16 are placed in the speed 2 condition in which switches 13, 14 and 15 are closed and switches 12 and 16 are open. It will be seen that current will pass through switch $F_4$ and switch 14 to maintain the coil F in an energized condition. In this speed position, electromagnetic coil 1A is energized so that the normally open switch 1AO is closed and the normally closed switch 1AC is open. Current will then pass through switch $F_1$, windings 4 and 5, switch $R_2$, resistor 6, normally open contact 1AO and normally closed contact 2AC, through the armature.

When switches 12 through 16 are in the speed 3 condition, switches 12 and 13 are open and switches 14, 15 and 16 are closed. Energization of electromagnetic coil 2A effects closure of the normally open switch 2AO and opening of the normally closed switch 2AC. Current will then pass from the battery through switch $F_1$, winding 4, normally open switch 2AO, resistor 8, and through the armature to conductor 2. In this speed condition, while some current will pass through winding 5, switch $R_2$ and resistors 6 and 8 to the armature, the value of resistors 6 and 8 is so chosen that the amount of current flow through winding 5 under these conditions is minimized.

When switches 12 through 16 are placed in the speed 4 condition, this being the high speed position, electromagnetic coil 1A is deenergized while electromagnetic coil 2A remains energized. Current will then pass from the battery through switch $F_1$, winding 4, normally open switch 2AO and normally closed switch 1AC through the armature to the conductor 2. The amount of current passing through winding 5 under this condition is, again, very small through the choice of resistor values.

When the operator desires to reverse the direction of rotation of the armature, push button 9 must be released to deenergize coil F. The switches will then return to the position indicated in the figure. When switches 12 through 16 are returned to the speed 1 position, closure of push button 11 will effect energization of the electromagnetic coil R. Switches $R_1$ and $R_4$ are then closed and switches $R_2$ and $R_3$ are thereby opened. Current will then pass from the battery 3 through switch $R_1$, winding 5, winding 4, switch $F_2$ and resistors 6 and 7, and normally closed switch 1AC to the armature.

As switches 12 through 16 are moved to the speed 2 position, current, which maintains coil R energized, passes through switch $R_4$ and switch 14, the current which energizes coil 1A passing through switches $R_4$, 14 and 15. The current for the motor then passes from battery 3 through switch $R_1$, winding 5, winding 4, switch $F_2$, resistor 6, normally open switch 1AO and normally closed switch 2AC to the armature.

In the speed 3 position, coils 1A and 2A are both energized so that current flows from the battery through switch $R_1$, winding 5, normally open switch 2AO and resistor 8 to the armature. As indicated earlier, very little current will pass through winding 4 in this condition due to the choice of resistor values in circuit with the winding 4.

In the speed 4 position, coil 1A is deenergized while coil 2A remains energized so that substantially the entire armature current passes through switch $R_1$, winding 5, normally open switch 2AO, normally closed switch 1AC and the armature to conductor 2.

It will be seen that the control circuit of the present invention may be used with many standard motors by connecting to the center tap of the series field. In addition, in view of the fact that with this circuit during the high speed operation in one direction one-half of the total series windings is used to carry substantially the entire armature current, while in the high speed position as the motor is operated in the opposite direction, the other half of the total series windings is used to carry substantially the entire armature current, the heating of the motor field is distributed. The circuit also provides for a smooth transition from each speed position to the next so that acceleration is gradually accomplished, particular attention being called to the fact that as the circuit passes from the speed 2 position, in which all field windings are used, to speed 3 position, in which only one-half of the total field windings are used, resistance is exerted in series with the partial windings so that the resulting acceleration is accomplished without sudden jolts. It is also obvious that any adverse residual magnetism in field structure is overcome when the motor is reversed, due to the high density field strength obtained by the use of the entire field winding, as the motor begins to operate in the opposite direction. In addition, the battery life is extended and the energy thereof efficiently employed in the control circuit of the present invention, and special attention is called to the fact that the lower voltage drop in the field winding when the motor is operated at full speed increases the efficiency of the motor on long runs.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit for an electric motor having an armature and a plurality of field winding portions, means for connecting said field winding portions in series and in series with said armature for starting and low speed operation, means for connecting one portion of said windings in series with said armature in a low resistance circuit for high speed operation in one direction of rotation, and means for connecting a different portion of said winding in series with said armature in a low resistance circuit for high speed operation in the opposite direction of rotation.

2. In a control circuit for an electric motor having an armature and a plurality of field winding portions, a starting resistance, means for connecting said field winding portions in series and in series with said starting resistance and said armature, means for cutting out at least a portion of said starting resistance as the motor speed increases, a secondary resistance, means for connecting one portion of said winding in series with said secondary resistance and said armature as the motor again increases in speed, means for connecting said one portion of said winding directly in series with said armature for full speed operation of said motor in one direction of rotation and means operative as the motor accelerates in the opposite direction of rotation for connecting a portion of said winding different from said one portion in series with said secondary resistance and armature and with said armature alone as the motor accelerates.

3. In a control circuit for an electric motor having an armature and a pair of field windings, forward and reverse switching means determining the direction of rotation of said motor, said switching means operating regardless of the direction of rotation to connect said field windings in series and in series with the armature for starting and low speed operation, means controlled by said forward switching means for connecting one field winding in series with the armature in a low resistance circuit for high speed operation in the forward direction and means controlled by the reverse switching means for connecting the other field winding in series with the armature in a low resistance circuit for high speed operation in the reverse direction.

4. In a control circuit for an electric motor having an armature and a pair of field windings, forward and reverse switching means determining the direction of rotation of said motor, said switching means operating regardless of the direction of rotation to connect said field windings in series and in series with the armature for starting and low speed operations, means controlled by said forward switching means for connecting one field winding in series with the armature in a low resistance circuit for high speed operation in the forward direction and means controlled by the reverse switching means for connecting the other field winding in series with the armature in a low resistance circuit for high speed operation in the reverse direction, in both forward and reverse operation the winding not in the low resistance circuit being connected through the armature through a relatively high resistance so that only a relatively minor current flows therethrough.

5. In a control circuit for an electric motor having an armature and a pair of field windings, forward switching means for said motor and winding, reverse switching means for said motor and winding, a starting resistance, each of said forward and reverse switching means when actuated connecting said windings in series and in series with said starting resistance and armature for an initial speed step, switching means for cutting out at least a portion of said starting resistance to provide a second speed step, and switching means for connecting one of said field windings in series with said armature in a circuit of substantially no resistance, the winding selected for connection to said armature being determined by whichever of the forward and reverse switching means is operated whereby to alternate the windings utilized for high speed operation of the motor.

6. In a control circuit for an electric motor having an armature and a pair of field windings, forward switching means for said motor and winding, reverse switching means for said motor and winding, a starting resistance, each of said forward and reverse switching means when actuated connecting said windings in series and in series with said starting resistance and armature for an initial speed step, switching means for cutting out at least a portion of said starting resistance to provide a second speed step, an auxiliary resistance, switching means for connecting one of said field windings in series with said armature through said auxiliary resistance, the actuation of whichever of the forward and reverse switching means is operated determining which of the field windings is connected to the armature through said auxiliary resistance, and switching means for cutting out said auxiliary resistance to connect the selected field winding directly in series with the armature.

References Cited in the file of this patent

UNITED STATES PATENTS

| Number | Name | Date |
| --- | --- | --- |
| 1,155,164 | Riley | Sept. 28, 1915 |
| 1,387,466 | Candee | Aug. 16, 1921 |
| 2,399,059 | Pell | Apr. 23, 1946 |
| 2,482,513 | Rossignol et al. | Sept. 20, 1949 |